United States Patent
Noh et al.

(10) Patent No.: US 11,134,486 B2
(45) Date of Patent: Sep. 28, 2021

(54) METHOD FOR ALLOCATING RESOURCES IN WIRELESS COMMUNICATION SYSTEM SUPPORTING FULL DUPLEX RADIO (FDR) TECHNOLOGY, AND APPARATUS THEREFOR

(71) Applicant: LG ELECTRONICS INC., Seoul (KR)

(72) Inventors: Kwangseok Noh, Seoul (KR); Dongkyu Kim, Seoul (KR); Hyunsoo Ko, Seoul (KR); Kukheon Choi, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 16/681,311

(22) Filed: Nov. 12, 2019

(65) Prior Publication Data

US 2020/0084769 A1    Mar. 12, 2020

Related U.S. Application Data

(63) Continuation of application No. 15/572,625, filed as application No. PCT/KR2015/010875 on Oct. 15, 2015, now Pat. No. 10,477,542.

(60) Provisional application No. 62/160,580, filed on May 12, 2015.

(51) Int. Cl.
*H04W 72/04* (2009.01)
*H04W 72/12* (2009.01)
*H04L 5/00* (2006.01)
*H04L 5/14* (2006.01)
*H04W 72/08* (2009.01)

(52) U.S. Cl.
CPC ....... *H04W 72/0446* (2013.01); *H04L 5/0058* (2013.01); *H04L 5/14* (2013.01); *H04L 5/1423* (2013.01); *H04W 72/087* (2013.01); *H04W 72/1284* (2013.01)

(58) Field of Classification Search
CPC ..... H04W 24/00; H04W 76/10; H04W 28/10; H04W 28/18
See application file for complete search history.

(56) References Cited

U.S. PATENT DOCUMENTS

| | | | |
|---|---|---|---|
| 9,131,501 B2 | 9/2015 | Gonsa et al. | |
| 9,420,606 B2 * | 8/2016 | Bhushan | H04L 5/14 |
| 9,860,767 B2 * | 1/2018 | Sorrentino | H04W 24/10 |
| 10,743,261 B2 * | 8/2020 | Boccardi | H04L 43/0829 |
| 2010/0322144 A1 | 12/2010 | Lee et al. | |
| 2013/0194984 A1 | 8/2013 | Cheng et al. | |
| 2013/0250866 A1 | 9/2013 | Hui et al. | |
| 2013/0322413 A1 | 12/2013 | Pelletier et al. | |

FOREIGN PATENT DOCUMENTS

WO    WO 2014/065592 A1    5/2014

* cited by examiner

*Primary Examiner* — Chandrahas B Patel
(74) *Attorney, Agent, or Firm* — Birch, Stewart, Kolasch & Birch, LLP

(57) ABSTRACT

A method for transmitting feedback information by a first user equipment (UE) in a wireless communication system supporting a full duplex radio (FDR) scheme includes measuring, based on information on a second UE received from a base station (BS), an inter-device interference (IDI) related to the second UE; and transmitting, to the BS, feedback information related to the IDI.

16 Claims, 4 Drawing Sheets

METHOD FOR ALLOCATING RESOURCES IN WIRELESS COMMUNICATION SYSTEM SUPPORTING FULL DUPLEX RADIO (FDR) TECHNOLOGY, AND APPARATUS THEREFOR

CROSS-REFERENCE TO RELATED APPLICATIONS

This application is a Continuation of co-pending U.S. patent application Ser. No. 15/572,625 filed on Nov. 8, 2017, which is the National Phase of PCT International Application No. PCT/KR2015/010875 filed on Oct. 15, 2015, which claims the priority benefit under 35 U.S.C. § 119(e) to U.S. Provisional Application No. 62/160,580 filed on May 12, 2015, all of which are hereby expressly incorporated by reference into the present application.

BACKGROUND OF THE INVENTION

Field of the Invention

The present invention relates to a wireless communication system, and more particularly, to a method for allocating resources in a wireless communication system supporting a full duplex radio (FDR) scheme and apparatus therefor.

Discussion of the Related Art

A full duplex radio (FDR) or full duplex communication scheme means a communication scheme for enabling a user equipment to simultaneously perform transmission and reception using the same resource. In this case, the same resource means the same time and frequency. FDR communication or full duplex communication can be referred to as two-way communication.

FIG. 1 is a conceptual diagram illustrating a user equipment (UE) and a base station (BS) that support FDR.

Referring to FIG. 1, there are three types of interferences in a network that supports the FDR. The first one is intra-device self-interference. The intra-device self-interference means that a signal transmitted from a transmit (Tx) antenna of a BS or UE is received by a receive (Rx) antenna of the BS or UE, thereby acting as interference. Since the signal transmitted from the TX antenna is transmitted with high power and a distance between the TX antenna and the RX antenna is relatively short, the signal is received at the RX antenna with almost no power loss. Thus, receive power of the signal is much higher than that of a desired signal. The second one is UE-to-UE inter-link interference. When a network supports the FDR, the UE-to-UE inter-link interference is increased. Specifically, if an uplink signal transmitted by a UE is received by an adjacently located UE, the uplink signal may act as interference to the adjacently located UE. This type of interference is referred to as the UE-to-UE inter-link interference. The third one is BS-to-BS inter-link interference. Similar to the UE-to-UE inter-link interference, the BS-to-BS inter-link interference is also increased when a network supports the FDR. If signals transmitted between BSs or heterogeneous BSs (e.g., pico, femto, relay, etc.) in a HetNet situation are received by an RX antenna of another BS, the signals may act as interference to another BS. This type of interference is referred to as the BS-to-BS inter-link interference.

SUMMARY OF THE INVENTION

An object of the present invention is to provide a method performed by a base station for allocating resources in a wireless communication system supporting a full duplex radio (FDR) scheme.

Another object of the present invention is to provide a base station for allocating resources in a wireless communication system supporting a full duplex radio (FDR) scheme.

It will be appreciated by persons skilled in the art that the objects that could be achieved with the present invention are not limited to what has been particularly described hereinabove and the above and other objects that the present invention could achieve will be more clearly understood from the following detailed description.

To achieve these objects and other advantages and in accordance with the purpose of the invention, in an aspect of the present invention, provided herein is a method for allocating resources by a base station (BS) in a wireless communication system supporting a full duplex radio (FDR) scheme, including: receiving a buffer status report (BSR) including an indicator indicating uplink data transmission urgency from a first user equipment (UE); and determining whether to allocate an uplink subframe for the first UE based on the indicator in a state in which a downlink subframe is allocated to a second UE in a specific time interval.

When the uplink data transmission urgency indicated by the indicator is equal to or higher than a predetermined threshold, the method may further include allocating the uplink subframe to the first UE in the specific time interval. When the uplink data transmission urgency indicated by the indicator is lower than a predetermined threshold, the method may further include determining whether to allocate the uplink subframe to the first UE in the specific time interval based on feedback information received from the second UE. When the feedback information received from the second UE includes an indicator indicating acceptance of the allocation of the uplink subframe to the first UE in the specific time interval, the method may further include allocating the uplink subframe to the first UE in the specific time interval. When the feedback information received from the second UE includes an indicator indicating rejection of the allocation of the uplink subframe to the first UE in the specific time interval, the method may further include allocating a resource different from the downlink subframe allocated to the second UE to the first UE. The different resource may be a time resource or a frequency resource different from the downlink subframe allocated to the second UE.

When the feedback information received from the second UE includes an indicator indicating rejection of the allocation of the uplink subframe to the first UE in the specific time interval, the method may further include transmitting, to the first UE, a message instructing to hold off uplink transmission during the specific time interval.

The method may further include: receiving, from the second UE, a Quality of Service (QoS) level required by the second UE; and when the QoS level is equal to or higher than a predetermined threshold, allocating the uplink subframe to the first UE on a frequency band different from that of the downlink subframe allocated to the second UE in the specific time interval.

The method may further include: receiving, from the second UE, a Quality of Service (QoS) level required by the second UE; and when the QoS level is equal to or higher than a predetermined threshold, allocating a downlink subframe for the second UE on a frequency band different from that of the downlink subframe allocated to the second UE in the specific time interval.

In another technical aspect of the present invention, provided herein is a base station (BS) for allocating resources in a wireless communication system supporting a full duplex radio (FDR) scheme, including: a receiver configured to receive a buffer status report (BSR) including an indicator indicating uplink data transmission urgency from a first user equipment (UE); and a processor configured to determine whether to allocate an uplink subframe for the first UE based on the indicator in a state in which a downlink subframe is allocated to a second UE in a specific time interval.

When the uplink data transmission urgency indicated by the indicator is equal to or higher than a predetermined threshold, the processor may be configured to allocate the uplink subframe to the first UE in the specific time interval. When the uplink data transmission urgency indicated by the indicator is lower than a predetermined threshold, the processor may be configured to determine whether to allocate the uplink subframe to the first UE in the specific time interval based on feedback information received from the second UE. When the feedback information received from the second UE includes an indicator indicating acceptance of the allocation of the uplink subframe to the first UE in the specific time interval, the processor may be configured to allocate the uplink subframe to the first UE in the specific time interval.

When the feedback information received from the second UE includes an indicator indicating rejection of the allocation of the uplink subframe to the first UE in the specific time interval, the processor may be configured to allocate a resource different from the downlink subframe allocated to the second UE to the first UE.

When the feedback information received from the second UE includes an indicator indicating rejection of the allocation of the uplink subframe to the first UE in the specific time interval, the BS may further include a transmitter configured to transmit, to the first UE, a message instructing to hold off uplink transmission during the specific time interval.

The received may be configured to further receive, from the second UE, a Quality of Service (QoS) level required by the second UE. When the QoS level is equal to or higher than a predetermined threshold, the processor may be configured to allocate the uplink subframe to the first UE on a frequency band different from that of the downlink subframe allocated to the second UE in the specific time interval.

The received may be configured to further receive, from the second UE, a Quality of Service (QoS) level required by the second UE. When the QoS level is equal to or higher than a predetermined threshold, the processor may be configured to allocate a downlink subframe for the second UE on a frequency band different from that of the downlink subframe allocated to the second UE in the specific time interval.

Advantageous Effects

According to the present invention, communication system performance can be improved by allocating resources in consideration of the amount, urgency, and IDI of data that will be transmitted and received between a base station and a user equipment in the system supporting full-duplex radio (communication) on the same resource.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Figure 1:
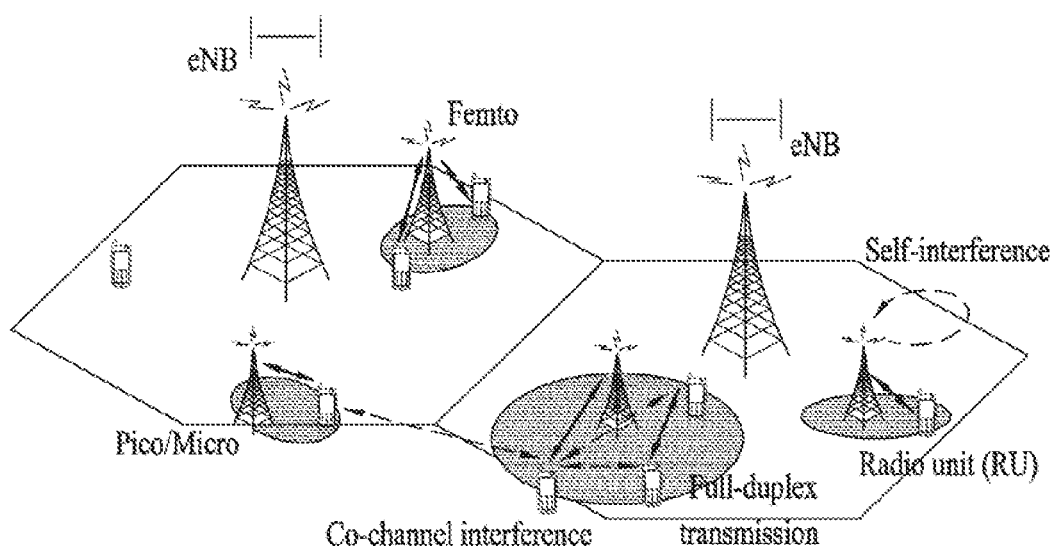
FIG. 1 is a conceptual diagram illustrating a user equipment (UE) and a base station (BS) that support FDR.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
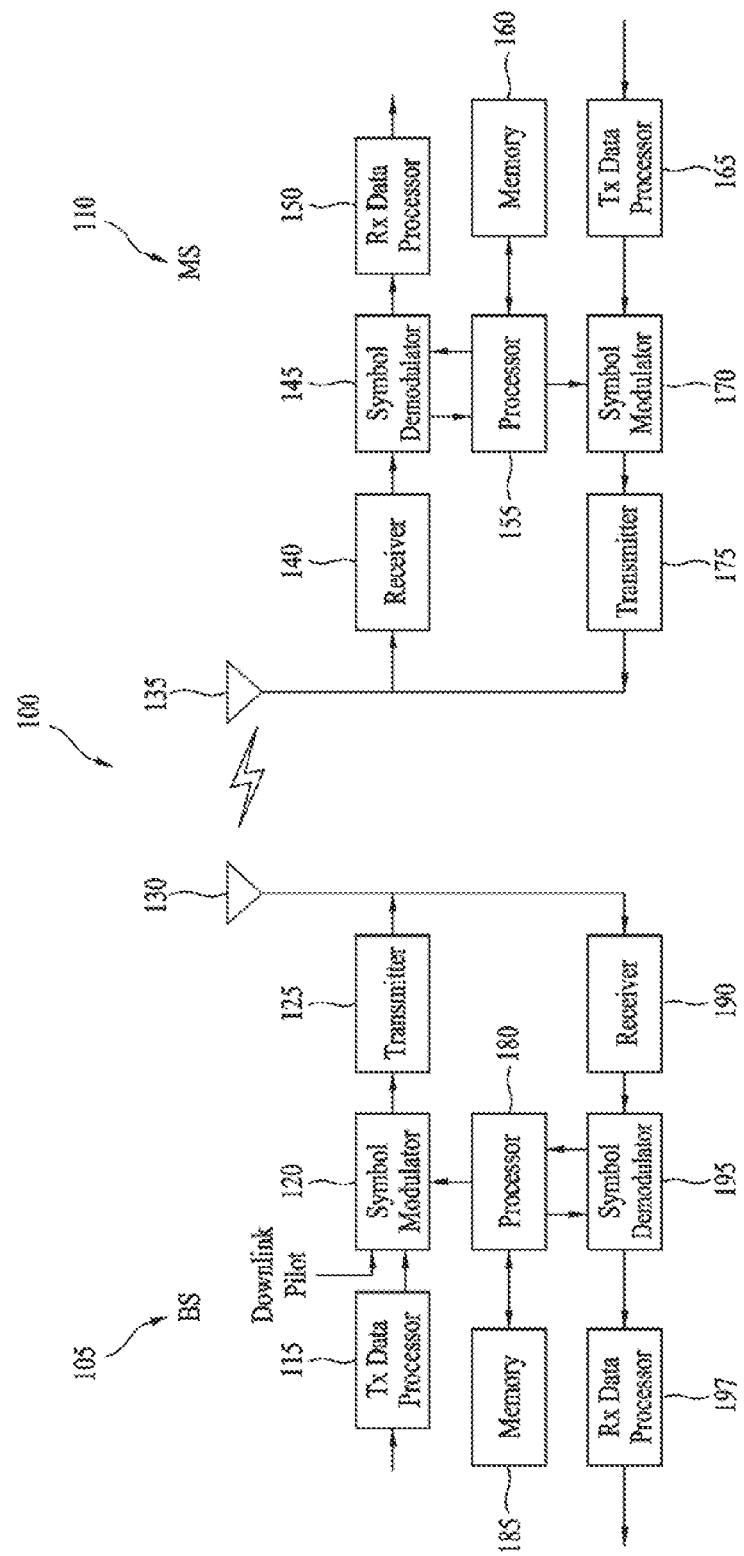
FIG. 2 is a block diagram illustrating configurations of a BS 105 and a UE 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
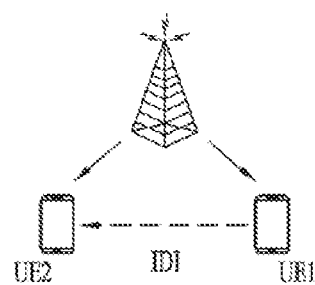
FIG. 3 is a diagram for explaining the concept of UE-to-UE interference (or inter-device interference (IDI)).

FIG. 3 is a diagram for explaining the concept of UE-to-UE interference (or IDI).

The IDI occurs only in the FDR system because the same resource is used within a cell. Specifically, FIG. 3 shows the concepts of the IDI, which occurs when a BS uses an FD mode (i.e., a mode for simultaneously performing transmission and reception using the same frequency) on the same resource. Although FIG. 3 shows a simple example in which there are two UEs for convenience of description, the present invention is not limited to the number of UEs. In the legacy full-duplex communication system, since frequency division duplex (FDD) or time division duplex (TDD) is used, i.e., resources used for transmission are different from those used for reception, the IDI does not occur. However, interference between neighboring cells in the legacy system still causes a problem to the FDR system. That is, in the FDR system, there is not only full duplex where the same resource is used but also full duplex where different resources are used.

Figure 4:
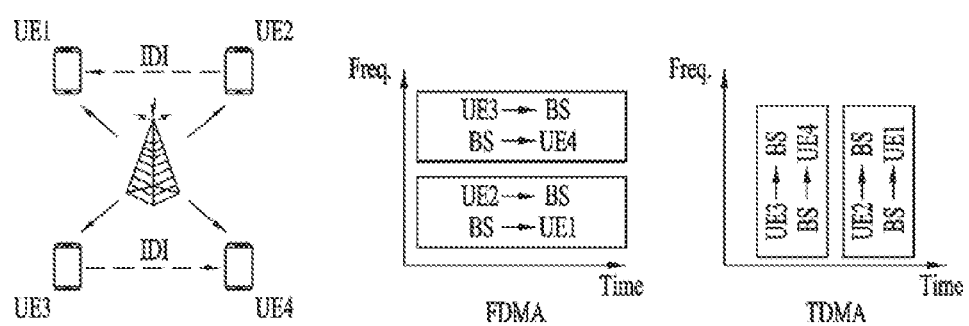
FIG. 4 is a diagram illustrating examples of frequency division multiple access (FDMA) and time division multiple access (TDMA) operations when a BS operates in a full duplex (FD) mode on the same resource and UEs performs multiple access.

FIG. 4 is a diagram illustrating examples of frequency division multiple access (FDMA) and time division multiple access (TDMA) operations when a BS operates in a full duplex (FD) mode on the same resource and UEs performs multiple access.

In the TDD system using full-duplex communication on the same resource, there are frame configurations for measuring interference between unsynchronized UEs and configuration methods for attempting to transmit and receive signals for identification between UEs. In addition, it is possible to achieve simultaneous transmission and reception using a UE-specific configuration for allocating different configurations to individual UEs in each cell. To mitigate or cancel IDI after IDI measurement, a unique signature can be assigned to each UE or each UE group. In this case, a signal for measuring interference from each UE is referred to as a signature signal.

After receiving the signature signal, a UE can obtain signal strength of a IDI-causing UE, a UE or signature index, a channel vector such as a phase, timing information and the like. Moreover, the signature signal can be implemented in various forms that can be used for identifying a UE or UE group such as a code sequence, a puncturing pattern, and the like. Unique scrambling or interleaving for a UE or UE group can be applied using the code sequence. To facilitate interference measurement at a receiving UE, the signature signal can be exclusively transmitted by only a single UE or UE group. In this case, a minimum exclusive unit may correspond to an orthogonal frequency division multiplex (OFDM) symbol.

In addition, in the FDR system, there may be a UE group classification (grouping) method and an IDI measurement and reporting method for grouping. That is, UE groups may be classified using order of the magnitudes of IDI measured by individual UEs. Additionally, it is possible to apply a UE group classification method where IDI cancellation/mitigation capability of each UE is considered instead of the number of UEs sharing the same resources.

Next, a description will be given of a buffer status report (BSR) performed at the medium access control (MAC) layer of the 3GPP LTE system. In the LTE system, a BS should know the type and amount of data to be transmitted by each UE in uplink for efficient use of uplink radio resources. To this end, a UE can transmit information on uplink data to be transmitted by itself to the BS, and the BS can allocate uplink resources to the corresponding UE based on the information. In this case, the information on the uplink data transmitted by the UE to the BS corresponds to the amount of data stored in a buffer of the UE, and this can be referred to as a buffer status report (BSR).

A UE transmits the BSR in the form of a MAC control element (CE), and in the LTE system, there are two types of BSRs: a short BSR and a long BSR.

Figure 5:
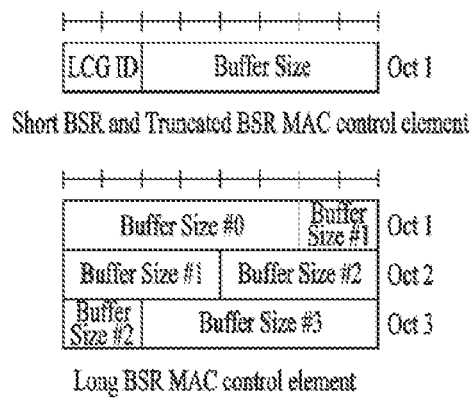
FIG. 5 is a diagram illustrating a BSR data structure of the 3GPP LTE system. Specifically, FIG. 5 (a) shows a short BSR MAC CE structure and FIG. 5 (b) shows a long BSR MAC CE structure.

FIG. 5 is a diagram illustrating a BSR data structure of the 3GPP LTE system. Specifically, FIG. 5 (*a*) shows a short BSR MAC CE structure and FIG. 5 (*b*) shows a long BSR MAC CE structure.

Which one of the short BSR and long BSR will be selected by a UE for transmission is determined based on the number of logical channel groups (LCGs) where uplink data exists. That is, if data to be transmitted is present in a single LCG, the UE transmits the short BSR to the BS. On the contrary, if data to be transmitted is present in two or more LCGs, the UE transmits the long BSR to the BS. In this case, the LCG means a group of logical channels with similar Quality of Service (QoS), which is obtained by performing grouping on multiple logical channels. Four LCGs from LCG ID #0 to LCG ID #3 have been used in the LTE system. When the BS configures one radio bearer (RB) for the UE, the BS informs which LCG logical channels of the corresponding RB belong to.

In addition, in the case of the short BSR, an identifier of an LCG, i.e., an LCG ID is included to indicate which LCG a buffer size field for indicating a buffer size is for. However, in the case of the long BSR, all LCGs from an LCG with LCG ID #0 to an LCG with LCG ID #3 sequentially include buffer size fields with no LCG ID.

Based on the BSR received from the UE, the BS determines resource allocation for the corresponding UE.

When a traffic model is a full buffer or when a UL/DL subframe is determined at a specific time, IDI may occur. However, in the real system, since a UL subframe is allocated based on the BSR, an FTP model can be applied. In this case, a method for avoiding or cancelling IDI that occurs fluidly is needed.

The present invention proposes a method for changing resources in a system using full-duplex communication on the same resource by considering IDI effects changed according to UL/DL configurations.

As described above, the BS can allocate a UL subframe based on the BSR received from the UE. However, if a DL subframe is allocated to the UE at the corresponding time, the UE may be affected by IDI due to the UL subframe. Since the BS knows DL/UL configurations of UEs, the BS can limit UL subframe allocation by considering the minimization of the IDI effects (including an IDI cancellation scheme).

Hereinafter, various embodiments in which the BS configures resource allocation in consideration of IDI will be described. These various embodiments can be implemented independently, or some of the embodiments can be combined with each other.

Embodiment 1: Use of Resource Allocation Timer

Figure 6:
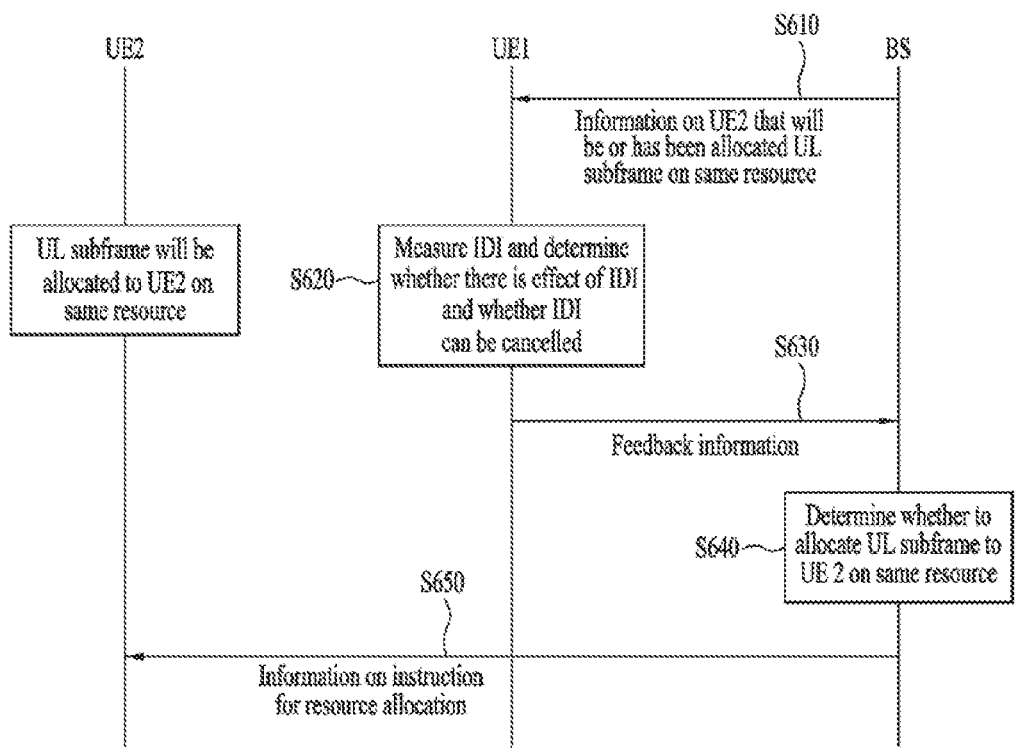
FIG. 6 is a diagram for explaining embodiment 1 of the present invention.

FIG. 6 is a diagram for explaining embodiment 1 of the present invention.

A BS can periodically allocate DL/UL subframes to a UE using a resource allocation timer, and this may be suitable for non-urgent data. That is, the BS may inform UE1 which will be or has been allocated a DL subframe on a specific resource (e.g., time-frequency resource) of information on UE2 which will be or has been allocated a UL subframe on the same resource as the specific resource through high layer signaling, a physical downlink shared channel (PDSCH), and the like [S610]. In addition, UE2 is scheduled to be allocated a UL subframe on the same resource as that of the DL subframe which will be or has been allocated to UE1 by the BS.

Thereafter, UE 1 can measure IDI from UE2, which will be or has been allocated the UL subframe, using the information on UE2 received from the BS and then determine whether there is an effect of the IDI and whether the IDI can be cancelled, using the measured IDI information [S620]. In addition, UE1 can transmit, to the BS, feedback information including whether the IDI effect is present and whether the IDI can be cancelled [S630].

The feedback information may include the following items. For example, as 1-bit feedback information, when the feedback information is set to '0', it may indicate that UE 1 rejects the allocation of the UL subframe to UE 2. When the feedback information is set to '1', it may indicate that UE 1 accepts the allocation of the UL subframe to UE 2. As another example, the feedback information may be configured to have a length equal to or greater than 2 bits. In this case, the feedback information may simultaneously inform acceptance/rejection of allocation of UL subframes to a plurality of UEs.

The BS can determine whether to allocate a UL resource to UE 2 using the feedback information received from UE 1 [S640]. Meanwhile, the BS may allocate the UL resource (e.g., UL subframe) to UE 2 irrespective of the feedback information about acceptance/rejection. Alternatively, when the feedback information indicates the rejection, the BS may allocate a different UL resource to UE 2 (i.e., UL UE) or instruct UE 2 to hold off the use of the corresponding resource [S650].

In the case of periodic DL/UL allocation, it is possible to use it as a function similar to the configuration for DL/UL UEs. A configuration period for each UE may be changed depending on characteristics of transmission data. In addition, although not shown in FIG. 6, the procedures described with reference to FIG. 6 may be performed after the BS receives BSRs from UEs.

Embodiment 2: Resource Allocation in Consideration of Urgency of Data

The resource allocation can be performed in consideration of requirements of transmission data. To this end, a UE can include an indicator (e.g., 1-bit indicator) indicating transmission urgency of UL data in a BSR and then transmit the BSR to a BS. For example, when the 1-bit indicator is set to '1', it may indicate that the transmission urgency of the UL data is equal to or higher than a predetermined threshold. Based on the indicator set to '1', the BS can allocate a UL subframe to the UE that transmits the indicator without consideration of IDI at a victim UE (here, the victim UE means a UE that receives interference from a UE which transmits a UL signal in a time interval where a DL subframe is allocated). On the contrary, when the indicator is set to '0' (that is, the urgency of the data is lower than the predetermined threshold), the procedures described with reference to FIG. 6 can be performed in the same manner.

As another example, the indicator may be configured to have a size of 2 bits or more to indicate a level of transmission urgency of UL data. The BS may allocate resources by giving a higher priority to data with higher urgency through comparison of transmission urgency of DL data and the level of the transmission urgency of the data indicated by the indictor. In this case, the urgency may be represented as an index value in accordance with the urgency level (for example, it is assumed that the urgency increases as the index value decreases). When at least one DL subframe and at least one UL subframe are present, the BS may allocate either the DL subframe(s) or the UL subframe(s) at a specific time by determining the urgency in consideration of the IDI effect. For example, assuming that DL data transmission urgency of DL UE 1 is '3', and UL data transmission urgency of UL UE 1 and UL data transmission urgency of UL UE 2 is '1' respectively, the BS may allocate UL subframes only at a specific time by considering that the DL UE is damaged due to the IDI. In this case, the BS may request victim candidate UEs to transmit feedback on acceptance/rejection in advance as shown in FIG. 6.

Embodiment 3: Resource Allocation in Consideration of Requirements of Transmission Data A BS can limit UL subframe allocation to satisfy requirements of a victim UE in consideration of QoS required by the victim UE, and the victim UE can inform the BS of its required QoS level through, for example, a 1-bit indicator. For example, if the 1-bit indicator is set to '1', it may indicate that the victim UE requires a service equal to or greater than a predetermined QoS value. As another example, the required QoS level may be indicated through an indicator with a size of 2 bits or more. In this case, the required QoS level may be represented as an index value in accordance with the required level. In other words, the BS can limit the UL subframe allocation in consideration of the corresponding required QoS level.

As described above, the BS can simultaneously consider the UL data transmission urgency and the QoS level required by the victim UE. When both of the QoS and the urgency needs to be satisfied, the BS may change a frequency allocated to a DL UE or UL UE and then allocate a DL subframe to the DL UE or a UL subframe to the UL UE in the changed frequency band.

Embodiment 4: Resource Allocation in Consideration of NACK

A BS can allocate resources in consideration of a NACK signal. In the case of a victim UE, the BS can limit UL subframe allocation according to the number of NACK signals in response to DL data which are generated by the victim UE. In the case of an aggressor UE (here, the aggressor UE means a UE allocated a UL subframe which causes interference to a victim UE allocated a DL subframe in the same time interval), the BS can limit DL subframe allocation according to the number of generated NACK signals in response to UL data. In this case, requirements for transmission data may be simultaneously considered.

Regarding available frequency resources, the BS may allocate the resources by considering the number of UEs that will be allocated UL subframes. Alternatively, the BS may allocate the resource by considering not only the number of UEs that will be allocated UL subframes but also the degree of IDI effects. For example, when frequencies f1, f2, and f3 are used on the assumption that the IDI effects are the same, the BS may allocate other frequencies (i.e., f2 or f3) except f1 to some UEs if the number of UL subframes allocated in f1 increases in a specific time interval.

When a packet loss is not allowed as in a TCP data channel, feedback on QoS is not used. In addition, in this case, the BS may give a higher priority to TCP data. In the case of TCP DL data, the BS may limit resource allocation for other UL UEs in consideration of IDI. Moreover, regarding ACK/NACK signals in response to corresponding DL data, the BS may allocate resources to other DL UEs at the corresponding time.

The BS may allocate UL/DL UEs as evenly as possible with respect to each frequency resource by considering a situation in which a high traffic fluctuation occurs. The BS allocates resources to individual UEs in the FDR system as evenly as possible in consideration of BSRs by managing n frequency candidate resources (where n<N, N is the total number of FDR frequencies). In this case, if a frequency is not allocated to a random UE with respect to the n candidates, the BS may operate as if the BS receives NACK from the corresponding UE. Alternatively, the BS may initiate a timer operation for the corresponding UE.

If such resource allocation methods are performed based on grouping, it is possible to obtain an advantage that the resource allocation can be easily performed using measured IDI-related information. For example, considering that best grouping is to allocate resources between UEs in a corresponding group based on the amount of measured IDI, and in this case, IDI effects on a victim UE are small, it is possible to neglect the IDI effects on the victim UE.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

A method for allocating resources in a wireless communication system supporting a full duplex radio (FDR) scheme and apparatus therefor can be applied industrially.

What is claimed is:

1. A method for transmitting feedback information by a first user equipment (UE) in a wireless communication system supporting a full duplex radio (FDR) scheme, the method comprising:
measuring, based on information on a second UE received from a base station (BS), an inter-device interference (IDI) related to the second UE;
transmitting, to the BS, feedback information related to the IDI;
receiving, from the BS, scheduling information about an uplink resource in a specific time interval, wherein the specific time interval is a time interval in which a downlink resource is allocated to the second UE; and
transmitting, to the BS, uplink data through the uplink resource.

2. The method of claim 1, wherein the feedback information further includes information about a rejection or an acceptance of an allocation of the uplink resource overlapping with the downlink resource.

3. The method of claim 2, wherein, based on the information about the acceptance of the allocation of the uplink resource, the uplink resource in the specific time interval is allocated to the first UE.

4. The method of claim 2, wherein, based on the information about the rejection of the allocation of the uplink resource, the uplink resource in the specific time interval is not allocated to the first UE.

5. A method for receiving feedback information by a base station (BS) in a wireless communication system supporting a full duplex radio (FDR) scheme, the method comprising:
transmitting, to a first user equipment (UE), information on a second UE;
receiving, from the first UE, feedback information related to an inter-device interference (DI) related to the second UE, wherein the IDI is measured based on the information on the second UE;
transmitting, to the first UE, scheduling information about an uplink resource in a specific time interval, wherein the scheduling information is generated based on the feedback information and specific time interval is a time interval in which a downlink resource is allocated to the second UE; and receiving, from the first UE, uplink data through the uplink resource.

6. The method of claim 5, wherein the feedback information further includes information about a rejection or an acceptance of an allocation of the uplink resource overlapping with the downlink resource.

7. The method of claim 6, wherein, based on the information about the rejection of the allocation of the uplink resource, the uplink resource in the specific time interval is not allocated to the first UE.

8. The method of claim 6, wherein, based on the information about the acceptance of the allocation of the uplink resource, the uplink resource in the specific time interval is allocated to the first UE.

9. A base station (BS) for receiving feedback information in a wireless communication system supporting a full duplex radio (FDR) scheme, the BS comprising:
    at least one transceiver;
    at least one processor; and
    at least one computer memory operably connectable to the at least one processor and storing instructions that, when executed by the at least one processor, perform operations comprising:
    transmitting, to a first user equipment (UE), information on a second UE; and
    receiving, from the first UE, feedback information related to an inter-device interference (IDI) related to the second UE, wherein the IDI is measured based on the information on the second UE;
    transmitting, to the first UE, scheduling information about an uplink resource in a specific time interval, wherein the scheduling information is generated based on the feedback information and specific time interval is a time interval in which a downlink resource is allocated to the second UE; and
    receiving, from the first UE, uplink data through the uplink resource.

10. The BS of claim 9, wherein the feedback information further includes information about a rejection or an acceptance of an allocation of the uplink resource overlapping with the downlink resource.

11. The BS of claim 10, wherein, based on the information about the rejection of the allocation of the uplink resource, the uplink resource in the specific time interval is not allocated to the first UE.

12. The BS of claim 10, wherein, based on the information about the acceptance of the allocation of the uplink resource, the uplink resource in the specific time interval is allocated to the first UE.

13. A first user equipment (UE) for transmitting feedback information in a wireless communication system supporting a full duplex radio (FDR) scheme, the first UE comprising:
    at least one transceiver;
    at least one processor; and
    at least one computer memory operably connectable to the at least one processor and storing instructions that, when executed by the at least one processor, perform operations comprising:
    measuring, based on information on a second UE received from a base station (BS), an inter-device interference (IDI) related to the second UE based on the information on the second UE; and
    transmitting, to the BS, feedback information on the IDI;
    receiving, from the BS, scheduling information about an uplink resource in a specific time interval, wherein the specific time interval is a time interval in which a downlink resource is allocated to the second UE; and
    transmitting, to the BS, uplink data through the uplink resource.

14. The first UE of claim 13, wherein the feedback information further includes information about a rejection or an acceptance of an allocation of the uplink resource overlapping with the downlink resource.

15. The first UE of claim 14, wherein, based on the information about the acceptance of the allocation of the uplink resource, the uplink resource in the specific time interval is allocated to the first UE.

16. The first UE of claim 14, wherein, based on the information about the rejection of the allocation of the uplink resource, the uplink resource in the specific time interval is not allocated to the first UE.

* * * * *